E. P. WELCH.
GAS GUN.
APPLICATION FILED DEC. 13, 1920.

1,384,366.

Patented July 12, 1921.

Witness
C. F. Wesson.

Inventor
Edward P. Welch
By Attorneys
Southgate & Southgate

250
UNITED STATES PATENT OFFICE.

EDWARD P. WELCH, OF WILSONVILLE, CONNECTICUT.

GAS-GUN.

1,384,366. Specification of Letters Patent. Patented July 12, 1921.

Application filed December 13, 1920. Serial No. 430,370.

*To all whom it may concern:*

Be it known that I, EDWARD P. WELCH, a citizen of the United States, residing at Wilsonville, in the county of Windham and State of Connecticut, have invented a new and useful Gas-Gun, of which the following is a specification.

This invention relates to a device for use in making a noise for Fourth of July celebrations and the like.

The principal objects of the invention are to provide an inexpensive and convenient device by which an explosive gas can be produced and exploded in a very simple way and in such a manner as to create a loud noise; to provide a combination of parts by which calcium carbid can be introduced into a receptacle as a charge and the necessary water applied to it very easily to create an explosive gas; to provide an equally simple means by which sparks can be produced therein to explode it; and to provide other features which will coöperate therewith for the purpose specified.

Reference is to be had to the accompanying drawings in which—

Figure 1:
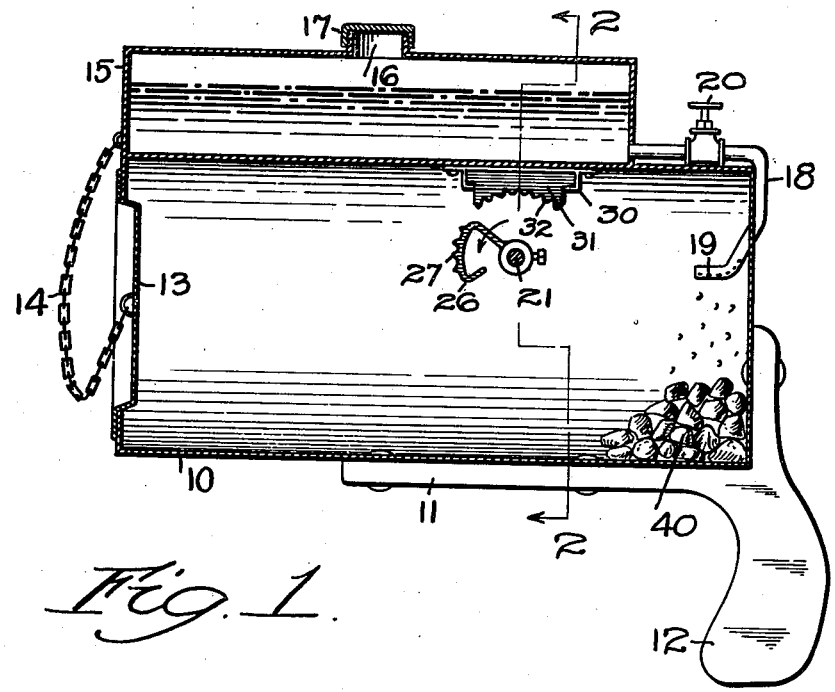
Figure 2:
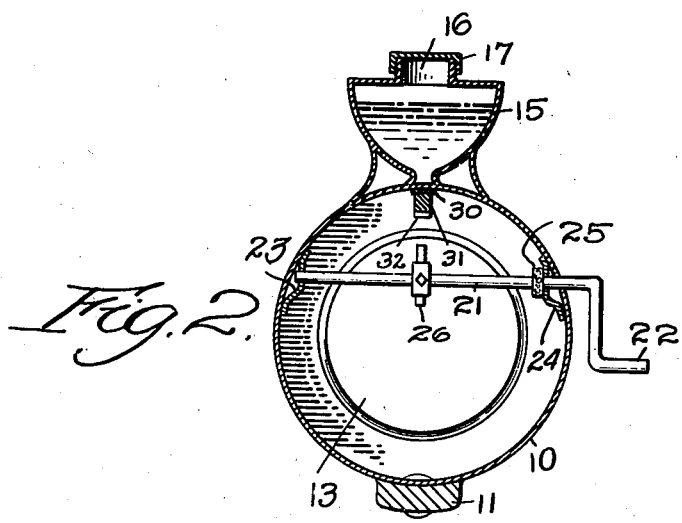

Figure 1 is a central longitudinal sectional view of a gas gun constructed in accordance with this invention, and Fig. 2 is a transverse sectional view of the same on the line 2—2 of Fig. 1.

I have shown the invention as involving a main casing 10 in the form of a cylinder or in any other convenient shape. This may be made of sheet metal and is provided at the bottom and rear with a rigid member 11 for supporting this casing, and having a projecting part 12 constituting a handle by which it can be held and manipulated.

The casing is provided with an opening in the front closed by a cover 13, preferably connected with a stationary part of the casing by a chain 14 or other flexible connection. This cover fits this opening frictionally and is adapted to be blown out upon the taking place of the explosion.

On the top of the casing there is a water receptacle 15 having an opening at 16 for filling purposes, closed by a cap 17. From this receptacle extends a pipe 18 down into the main casing 10. The end of this pipe is provided with perforations 19 in the bottom sufficiently small to permit of the water running down from the receptacle 15 to be discharged in the form of drops or very fine streams. A valve 20 is adapted to be closed normally and to be opened when it is desired to operate the device.

Through the casing runs a shaft 21 having a crank 22 on the outside for turning it. This shaft is mounted in bearings 23 and 24 in the sides of the casing, preferably formed of sheet metal or in any other convenient manner. A felt washer 25 is shown adjacent to one of them for keeping the parts tight. On this shaft there is mounted a steel spring 26 having teeth 27 arranged circularly thereon in a series concentric with the shaft.

Fixed on the casing at a convenient point is a frame 30 preferably formed of sheet metal and riveted to the casing. This supports a piece of flint 31 which is provided with one or more teeth 32 located on the arc of a circle concentric with the shaft 21 and in such position that when the shaft is turned the teeth on the steel 26 will engage the teeth on the flint. It is for the purpose of permitting of such engagement and disengagement that the steel teeth 27 are mounted on the spring 26 to let them yield slightly. Either the flint or steel can be mounted yieldingly.

Normally the receptacle 15 is kept with a quantity of water in it, and the valve 20 is kept closed. When it is desired to operate the gun the cover 13 is removed and a quantity of calcium carbid 40 or other material that is capable of generating an explosive gas is introduced into the extreme rear end of the can under the opening 19. Now the cover 13 is replaced and forced into position, so that it will hold itself there by friction. Then the valve 20 is opened for a very short period to allow a little water to trickle down into the carbid. This forms acetylene gas, and the device is then ready for use. Explosion is caused by turning the crank 22 and causing the teeth of flint and steel to engage each other rapidly and to make and break constant quickly several times in succession. This creates sparks which explode the acetylene. The result of the explosion is to drive the cover 13 out. This, as stated, is intended for use in celebrations and the like where it is desired to produce a loud noise. The unconverted carbid remains in the rear.

The device can be used over and over repeatedly without inserting new charges of carbid but closing the casing Although I have illustrated and described only a single form of the invention I am aware of the fact that modifications can be made therein by any person skilled in the art without departing from the scope of the invention as expressed in the claims. Therefore I do not wish to be limited to all the details of costruction herein shown and described, but what I do claim is:—

1. In a gas gun of the character described, the combination of a casing arranged to receive a charge of solid gas forming material, a liquid receptacle outside the casing having an outlet pipe for permitting the liquid to drop on said material within the casing, and means inside the casing for creating a spark to explode the gas thereby produced.

2. In a gas gun of the character described, the combination of a casing having a cover frictionally fitting therein and arranged to receive a charge of explosive gas forming material at one end, a water receptacle located over the casing and having an outlet pipe provided with small perforations for permitting the water to drop on the gas forming material in the casing in small quantities, and means inside the casing for creating a spark to explode the gas thereby produced.

3. In an acetylene gas gun, a casing for receiving calcium carbid, a receptacle mounted on its top having an outlet pipe opening into the interior of said casing above the carbid and provided with perforations, a valve for said pipe whereby water can be dropped upon the carbid within the casing to form acetylene gas therefrom, a shaft supported by the casing, and a flint and steel both located in the casing adapted to be brought into contact by rotation of the shaft to create sparks within the casing and explode the acetylene gas.

4. In an acetylene gas gun, the combination of a casing for holding a charge of calcium carbid, a handle connected with the casing for supporting it, means for introducing drops of water into the casing on the carbid, a shaft extending into the casing and supported at its opposite ends thereby, a crank connected with the shaft, a piece of steel on the shaft provided with teeth on the surface concentrically arranged, and a piece of flint mounted in the casing and having teeth thereon concentrically arranged with respect to the shaft and in position to be engaged by the steel teeth as the shaft rotates.

5. In an acetylene gas gun, the combination of a casing for holding a charge of calcium carbid, a handle connected with the casing for supporting it, means for introducing drops of water into the casing on the carbid, a shaft extending through the casing and supported at its opposite ends thereby, a crank on the shaft outside the casing, a piece of steel yieldingly mounted on the shaft and provided with teeth on the surface concentrically arranged, and a piece of flint mounted in the casing and having teeth thereon concentrically arranged with respect to the shaft, to permit of the steel engaging the teeth of the flint as it rotates and passes along its toothed surface.

6. In a gas gun, the combination of a casing for holding a charge of solid gas forming material, means for introducing drops of liquid into the casing into contact therewith, whereby an explosive gas will be formed, a shaft located in the casing, a piece of steel and a piece of flint, one mounted on the shaft and the other in the casing, and having teeth thereon concentrically arranged with respect to the shaft, whereby when the shaft is rotated the steel and flint will engage and sparks will be produced to explode the gas.

7. In a gas gun, the combination of a casing for holding a charge of gas producing material, a handle projecting down from the rear end of the casing for supporting it, means for introducing drops of liquid into the casing on the gas-forming material, and a cover for the casing adapted to be discharged when the gas is exploded.

In testimony whereof I have hereunto affixed my signature.

EDWARD P. WELCH.